US009632928B2

(12) United States Patent
Bacon et al.

(10) Patent No.: US 9,632,928 B2
(45) Date of Patent: Apr. 25, 2017

(54) PARALLEL GARBAGE COLLECTION IMPLEMENTED IN HARDWARE

(71) Applicant: International Business Machines Corporation, Armonk, NY (US)

(72) Inventors: David F. Bacon, Sleepy Hollow, NY (US); Perry S. Cheng, Cambridge, MA (US); Sunil K. Shukla, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/141,318

(22) Filed: Apr. 28, 2016

(65) Prior Publication Data

US 2016/0239414 A1 Aug. 18, 2016

Related U.S. Application Data

(63) Continuation of application No. 14/298,532, filed on Jun. 6, 2014, now Pat. No. 9,355,030.

(51) Int. Cl.
*G06F 12/02* (2006.01)
*G06F 12/121* (2016.01)
*G06F 9/52* (2006.01)

(52) U.S. Cl.
CPC ............ *G06F 12/0261* (2013.01); *G06F 9/52* (2013.01); *G06F 12/023* (2013.01);
(Continued)

(58) Field of Classification Search
CPC ......... G06F 12/0253; G06F 2212/7205; G06F 12/0261; G06F 12/0276; G06F 2212/702;
(Continued)

(56) References Cited

U.S. PATENT DOCUMENTS

| 5,848,419 A * | 12/1998 | Hapner ................. G06F 9/4435 |
| 2013/0318290 A1 | 11/2013 | Bacon et al. |
| 2015/0100752 A1 | 4/2015 | Flood |

OTHER PUBLICATIONS

Zhou et al., "Locality-Aware Many-Core Garbage Collection", Center for Embedded Computer Systems, University of California, Irvine, Irvice, CA 92697-2620, USA, CECS Technical Report 10-08, Aug. 24, 2010, pp. 1-12.

(Continued)

*Primary Examiner* — Jasmine Song
(74) *Attorney, Agent, or Firm* — Scully, Scott, Murphy & Presser, P.C.; Keivan Razavi, Esq.

(57) ABSTRACT

Embodiments of the invention provide a method and system for dynamic memory management implemented in hardware. In an embodiment, the method comprises storing objects in a plurality of heaps, and operating a hardware garbage collector to free heap space. The hardware garbage collector traverses the heaps and marks selected objects, uses the marks to identify a plurality of the objects, and frees the identified objects. In an embodiment, the method comprises storing objects in a heap, each of at least some of the objects including a multitude of pointers; and operating a hardware garbage collector to free heap space. The hardware garbage collector traverses the heap, using the pointers of some of the objects to identify others of the objects; processes the objects to mark selected objects; and uses the marks to identify a group of the objects, and frees the identified objects.

20 Claims, 11 Drawing Sheets

(52) U.S. Cl.
CPC ...... *G06F 12/0238* (2013.01); *G06F 12/0253* (2013.01); *G06F 12/0269* (2013.01); *G06F 12/121* (2013.01); *G06F 2212/1008* (2013.01); *G06F 2212/1016* (2013.01); *G06F 2212/1044* (2013.01); *G06F 2212/702* (2013.01)

(58) Field of Classification Search
CPC .............. G06F 12/121; G06F 12/0238; G06F 2212/1044; G06F 12/023; G06F 12/0269; G06F 9/52
USPC .................. 711/159, 170, 171; 707/813, 816
See application file for complete search history.

(56) References Cited

OTHER PUBLICATIONS

Steele, Jr., "Data Representations in PDP-10 Maclisp", Massachusetts Institute of Technology Artificial Intelligence Laboratory, AI Memo 420, Sep. 1977, pp. 1-12.

"Virtex-5 Family Overview", Xilinx, Inc., DS100, (v5.0), Feb. 6, 2009, Product Specification, pp. 1-13.

Simsa et al., "Designing Hardware with Dynamic Memory Abstraction", FPGA'10, Feb. 21-23, 2010, Monterey, California, USA, pp. 69-72.

Schoeberl et al., "Nonblocking Real-Time Garbage Collection", ACM Transactions on Embedded Computing Systems, vol. 10, No. 1, Article 6, Aug. 2010. pp. 6:1-6:28.

Click et al., "The Pauseless GC Algorithm", Vee'05, Jun. 11-12, 2005, Chicago, IL, USA, pp. 46-56.

Canis et al., "LegUp: An Open-Source High-Level Synthesis Tool for FPGA-Based Processor/Accelerator Systems", ACM Transactions on Embedded Computing Systems, vol. 13, No. 2, Article 24, Sep. 2013, pp. 24:1-24:27.

Baker, Jr, "List Processing in Real Time on a Serial Computer", Communications of the ACM, vol. 21, No. 4, Apr. 1978, pp. 280-294.

Bacon, et al., "And Then There Were None: A Stall-Free Real-Time Garbage Collector for Reconfigurable Hardware", PLDI'12, Jun. 11-16, 2012, Beijing, China, pp. 23-34.

Colwell et al., "A VLIW Architecture for a Trace Scheduling Compiler", ASPLOS II Proceedings of the second International conference on Architectual support for programming languages and operating systems, Oct. 5-8, 1987 pp. 180-192.

Ungar et al., "Architecture of SOAR: Smalltalk on a RISC", Proceeding ISCA '84 Proceedings of the 11th annual International symposium on Computer architecture, Jun. 1984, pp. 188-197.

Schmidt et al., "Performance of a Hardware-Assisted Real-Time Garbage Collector", Proceeding ASPLOS VI Proceedings of the sixth international conference on Architectural support for programming languages and operating systems, Oct. 5-7, 1994, pp. 76-85.

Moon, "Garbage Collection in a Large Lisp System", Proceeding LFP '84 Proceedings of the 1984 ACM Symposium on LISP and functional programming, Aug. 6-8, 1984, pp. 235-246.

Meyer, "An On-Chip Garbage Collection Coprocessor for Embedded Real-Time Systems", Embedded and Real-Time Computing Systems and Applications, 2005. Proceedings. 11th IEEE International Conference on ,Aug. 17-19, 2005, pp. 517-524.

McCarthy, "Recursive Functions of Symbolic Expressions and Their Computation by Machine, Part I", Massachusetts Institute of Technology, Cambridge, Mass, Communication of the ACM, vol. 3, Issue 4, Apr. 1960, pp. 184-195.

Levanoni et al., "An on-the-fly Reference Counting Garbage Collector for Java", ACM SIGPLAN Notices Homepage vol. 36 Issue 11, Nov. 1, 2001, pp. 367-380.

Faes et al., "FPGA-Aware Garbage Collection in Java", Field Programmable Logic and Applications, 2005. International Conference on Aug. 24-26, 2005, 675-680.

Cook et al., "Finding heap-bounds for hardware synthesis", Formal Methods in Computer-Aided Design, 2009. FMCAD 2009 Nov. 15-18, 2009, pp. 205-212.

Abdullahi et al., "Garbage Collecting the Internet: A Survey of Distributed Garbage Collection", ACM Computing Surveys, vol. 30, No. 3, Sep. 1998.

List of IBM Patents or Patent Applications Treated as Related.

* cited by examiner

| Benchmark | Heaps | Min Heap | GC Count | Max GC | Avg GC | Avg Mark | Mark Stalled | Avg ReQ's | Avg Sweep | Mutation Rate | Alloc. Rate | Foreign Ptrs | Barrier Q Max |
|---|---|---|---|---|---|---|---|---|---|---|---|---|---|
| SortedList | 1 | 1.094 | 199 | 2037 | 1360 | 1076 | 77.0% | 0 | 280 | 0.084 | 0.044 | 0.0% | 0 |
|  | 2 | 1.125 | 205 | 2101 | 1290 | 1142 | 89.1% | 0 | 144 | 0.080 | 0.041 | 51.0% | 1 |
|  | 4 | 1.219 | 214 | 2063 | 1292 | 1210 | 94.8% | 0 | 78 | 0.080 | 0.042 | 76.4% | 1 |
| SearchTree | 1 | 1.031 | 316 | 583 | 549 | 281 | 15.7% | 0 | 264 | 0.032 | 0.034 | 0.0% | 0 |
|  | 2 | 1.094 | 411 | 370 | 336 | 192 | 37.5% | 1 | 140 | 0.032 | 0.034 | 52.1% | 1 |
|  | 4 | 1.219 | 440 | 315 | 271 | 189 | 67.2% | 1 | 78 | 0.030 | 0.032 | 73.9% | 1 |
| EM3D | 1 | 1.062 | 359 | 1512 | 1173 | 794 | 76.3% | 0 | 272 | 0.495 | 0.245 | 0.0% | 0 |
|  | 2 | 1.094 | 359 | 933 | 741 | 497 | 69.4% | 57 | 140 | 0.473 | 0.238 | 44.6% | 1 |
|  | 4 | 1.156 | 399 | 706 | 537 | 351 | 42.7% | 155 | 74 | 0.387 | 0.194 | 65.2% | 1 |
| TSP | 1 | 1.500 | 14 | 785 | 710 | 320 | 33.8% | 0 | 384 | 0.395 | 0.063 | 0.0% | 0 |
|  | 2 | 1.500 | 14 | 444 | 383 | 186 | 43.5% | 2 | 192 | 0.395 | 0.063 | 24.3% | 0 |
|  | 4 | 1.656 | 27 | 278 | 251 | 138 | 51.4% | 1 | 106 | 0.395 | 0.063 | 25.5% | 1 |

Table1. Dynamic measurements of the four benchmarks running on 1,2, and 4 heaps.

FIG. 9

PARALLEL GARBAGE COLLECTION IMPLEMENTED IN HARDWARE

CROSS REFERENCE TO RELATED APPLICATION

This application is a continuation of copending U.S. patent application Ser. No. 14/298,532, filed Jun. 6, 2014, the entire contents and disclosure of which are hereby incorporated herein by reference.

BACKGROUND OF THE INVENTION

In recent years, the search for enhanced computing performance has led to heterogeneous computing systems exploiting large amounts of parallelism. One example of this is the generation of custom hardware for a program, either an ASIC or using field-programmable gate arrays (FPGAs). Current FPGAs contain multiple megabytes of on-chip memory, configured in hundreds of individual banks which can be accessed in parallel with single-cycle latency.

As the size and complexity of FPGAs increase, garbage collection emerges as a plausible technique for improving programmability of the hardware and raising its level of abstraction.

One drawback of FPGAs is programming methodology. The most common computer languages for FPGAs are relatively low-level hardware description languages such as, for example, very-high-speed integrated circuits hardware description language (VHDL) and Verilog. These low-level languages use abstractions that are bits, arrays of bits, registers, wires, and other hardware, which make programming FPGAs much more complex than conventional central processing units (CPUs). Thus, there is a focus on raising the level of abstraction and programmability of FPGAs to that of higher-level software based programming languages.

One fundamental feature of high-level languages is automatic memory management, in the form of garbage collection (i.e., attempts to reclaim memory occupied by objects that are no longer in use by a program).

BRIEF SUMMARY

Embodiments of the invention provide a method and system for dynamic memory management implemented in hardware. In an embodiment, the method comprises storing objects in a plurality of heaps, and operating a hardware garbage collector to free heap space occupied by specified ones of the objects. The operating a hardware garbage collector includes traversing the plurality of the heaps and marking selected ones of the objects of the heaps based on given criteria; and Using said marks to identify a plurality of the objects, and freeing the identified plurality of objects.

In an embodiment, the hardware garbage collector includes a system marking engine and a sweep engine, and the operating the hardware garbage collector to free heap space includes using the system marking engine to traverse the heaps and to mark the selected ones of the objects, and using the sweep engine to free the identified plurality of objects.

In an embodiment, the garbage collector is comprised of hardware selected from the group comprising: reconfigurable logic devices; and an application specific integrated circuit; each of the heaps is implemented in an associated memory with a fixed latency for read and write operations; and each of the heaps is capable of storing objects with an arbitrary but fixed number of pointer and data fields.

In an embodiment, at least some of the objects include pointers that reference others of the objects; the garbage collector further includes a root collection engine to provide object references that reference selected ones of the objects; and the operating the hardware garbage collector to free heap space further includes using the system marking engine to compute a mark map by doing a transitive closure of the object references provided by the root collection engine.

In an embodiment, the hardware garbage collector includes a system marking engine and a sweep engine, and the operating the hardware garbage collector to free heap space includes using the system marking engine to traverse the heaps and to mark the selected ones of the objects, and using the sweep engine to free the identified plurality of objects.

In an embodiment, at least some of the objects include pointers that reference others of the objects; the pointers of objects in each of the heaps include local pointers and foreign pointers; the local pointers of each of the heaps point to objects stored in the each heap; and the foreign pointers of each of the heaps point to objects stored in others of the heaps. In this embodiment, each of the single heap mark engines includes a foreign barrier queue for storing the foreign pointers of the one of the heaps that is traversed by the each mark engine, and the each of the mark engines puts the foreign pointers in and removes the foreign pointers from the foreign barrier queue of the each mark engine for processing by others of the mark engines.

In an embodiment, the using the hardware garbage collector further includes implementing a termination protocol to terminate a mark phase of the garbage collector.

In an embodiment, the implementing a termination protocol includes the mark engine of each of the heaps, under defined conditions, asserting a ready to terminate signal to a termination engine; the termination engine, upon receiving the ready to terminate signals from all the heaps, broadcasting a start termination signal to all the mark engines; each of the mark engines, upon receiving the start termination signal, recording an occupancy of the foreign barrier queue of the each mark engine into a termination counter; and in each of the mark engines, decrementing the termination counter of the each mark engine whenever a pointer is removed from the foreign barrier queue of the each mark engine. In this embodiment, implementing the termination protocol further includes each of the mark engines asserting a foreign barrier complete signal to the termination engine when the termination counter of the each mark engine reaches zero; the termination engine initializing a countdown timer to a predetermined value upon receiving the foreign barrier complete signals from all the mark engines; aborting the termination protocol if any of the mark engines encounters an unmarked object during the termination protocol; and declaring the termination protocol complete if the countdown timer reaches 0.

In an embodiment, the method comprises storing objects in a heap, each of at least some of the objects including a multitude of pointers that reference others of the objects; and operating a hardware garbage collector to free heap space occupied by specified ones of the objects. The operating a hardware garbage collector includes traversing the heap, including using the multitude of pointers of said at least some of the objects to identify others of the objects of the heap; processing the objects of the heap to mark selected ones of the objects based on given criteria; and using said marks to identify a group of the objects to be freed, and freeing the identified group of the objects.

In an embodiment, the heap is capable of storing objects with an arbitrary but fixed number of pointer fields; and the garbage collector further includes a root collection engine to provide object references that reference selected ones of the objects.

In an embodiment, the hardware garbage collector includes a mark engine and a sweep engine, and the operating the hardware garbage collector to free heap space includes using the mark engine to traverse the heap and to mark the selected ones of the objects during a mark phase; and using the sweep engine to free the identified plurality of objects.

In an embodiment, the method further comprises implementing a termination protocol to terminate the mark phase of the mark engine. The termination protocol comprising commencing processing of a last unprocessed pointer from the heap; starting a countdown timer with a count set to a specified logical pipeline depth of the mark engine; decreasing the count of the countdown timer according to a defined procedure. The termination protocol further comprises coming out of the termination protocol if, before the countdown timer reaches zero, a new work item is generated for the heap; and declaring termination of the mark phase of the mark engine when the countdown timer reaches zero.

Embodiments of the invention support object heterogeneity by having plural or multiple heaps, each with different object layouts. In hardware, plural or multiple heaps can be coordinated within one or two clock cycles, greatly simplifying distributed agreement.

Embodiments of the invention provide a garbage collector for reconfigurable hardware comprising plural or multiple heterogeneous heaps, making hardware garbage collection practical for complex data structures.

BRIEF DESCRIPTION OF THE SEVERAL VIEWS OF THE DRAWINGS

FIG. 9 is a table that shows dynamic measurements of four garbage collection processes, using 1, 2 and 4 heaps.

DETAILED DESCRIPTION

Figure 1:
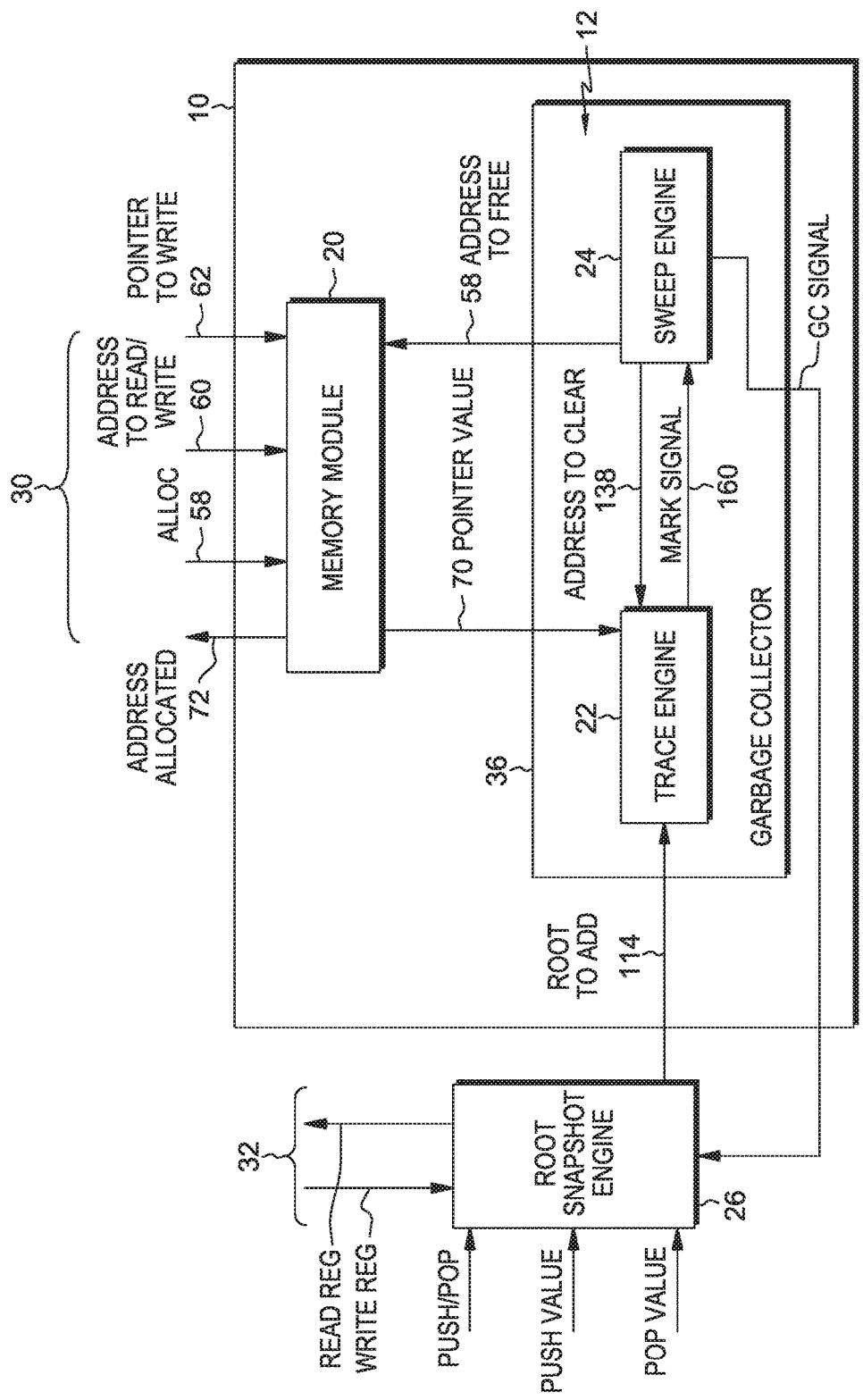
FIG. 1 is a block diagram of an exemplary field-programmable gate array (FPGA) having a garbage collector according to one embodiment of the invention.

Garbage collection that is implemented in hardware has emerged as a plausible technique for improving programmability of hardware and raising its level of abstraction. Bacon et al. [D. F. Bacon, P. Cheng, and S. Shulka. And then there were none: A stall free real-time garbage collector for reconfigurable hardware. In PLDI, pp. 23-34, 2012] demonstrated the first garbage collector for on-chip memory in reconfigurable hardware, but the disclosed system only handles two pointers per object. In an embodiment of this invention, this design was generalized and improved to allow an arbitrary—but fixed—number of pointers per object. This allows the support of general data types. However, real programs may use many data types, with potentially very different sizes and pointer densities.

There are essentially two ways to support diverse data types. The first is to make the heap itself more flexible, with variable object sizes, byte-addressability, and so on. However, such a design would sacrifice many of the fundamental desirable properties of these hardware garbage collectors: deterministic single-cycle access, support for parallel operations on fields, etc. Furthermore, placing all objects in a single heap eliminates the possibility of parallel access to different objects, which is also inimical to hardware implementation. Fundamentally, a traditional byte-oriented, variable object-size heap would be applying a software-oriented approach to hardware, and thereby sacrifice the fundamental advantages of the hardware itself.

The alternative is to support object heterogeneity by having multiple hardware heaps, each with different object layouts. This is roughly analogous to the "big bag of pages" approach to a software memory allocator, in which each page only contains one type of object, and the metadata for the objects is implicit in the page in which they reside [G. L. Steele, Jr. Data representation in PDP-10 MACLISP/Tech rep., MIT, 1977. AI Memo 420].

Embodiments of this invention utilize the latter style of solution. The challenges in such a design primarily lie in managing the coordination between the heaps, avoiding live-lock and deadlock, ensuring that single-cycle access is maintained, and devising a correct and efficient termination algorithm.

An embodiment of a garbage collector implemented in computer hardware (as opposed to previous hardware-assist techniques) is disclosed. In one embodiment, a field-programmable gate array (FPGA) and an on-chip memory are disclosed. Utilizing a concurrent snapshot algorithm, the garbage collector as disclosed provides single-cycle access to two or more heaps, and does not stall a mutator for a single cycle, thus achieving a deterministic mutator utilization (MMU) of about 100%. In various embodiments, the garbage collector as disclosed does not consume more than about 2% of the logic resources of a relatively high-end FPGA. In the embodiments as disclosed, the garbage collector may include either a stop-the-world or a fully concurrent configuration. However, when implemented in hardware, real-time collection may achieve a higher throughput, lower latency, lower memory usage, and energy consumption when compared to the stop-the-world configuration.

With reference to FIG. 1, a block diagram of an exemplary field-programmable gate array (FPGA) 10 is shown having a memory module 20. The FPGA 10 includes various programmable gates 12, which may be programmed to include one or more modules or engines. In the embodiment as shown, the FPGA 10 includes a trace engine 22, a sweep engine 24, and a root snapshot engine 26. The memory module 20 may store configuration information, where a first application interface 30 that is in communication with the memory module 20, which receives programming instructions and communicates information to and from a host (not shown). The memory module 20 is also in communication with the trace engine 22 and the sweep engine 24, where the trace engine receives data from the memory module 20. A second application interface 32 is in communication with the root snapshot engine 26. The root snapshot engine 26 is in communication with a host (not shown) over the second application interface 32. The host may separately communicate with the root snapshot engine 26 over the second application interface 32. The trace engine 22 and the sweep engine 24 create a garbage collector 36.

Although FIG. 1 illustrates an FPGA, it is understood that any type of computing device having a managed memory implemented as one or more hardware circuits using a hardware description language may be used as well such as, for example, an application specific integrated circuit (ASIC) having appropriate combinational logic gates or a programmable gate array (PGA). The FPGA 10 may be in communication with a client application that is written in a hardware description language such as, for example, very-high-speed integrated circuits hardware description language (VHDL) and Verilog. The FPGA 10 may also be in communication with a client application written in a higher-level software based programming language such as, for example, C, C++, SystemC, Perl, Python, C#, CUDA, Java, OpenCL, or a language that is derived therefrom, where a compiler (not illustrated) converts the higher-level software based programming language into the hardware description language.

In one embodiment, the FPGA 10 is a programmable logic device having 4- or 6-input look-up tables (LUTs) which can be used to implement combinational logic, and flip-flops (not illustrated) which can be used to implement sequential logic. Specifically, several LUTs and flip-flops may be combined together to form a unit called a slice, which is the standard unit in which resource consumption is reported for FPGAs. The FPGA 10 also includes a clock distribution network (not illustrated) for propagating a globally synchronized clock to allow for the use of conventional clocked digital logic. In one embodiment, the global clock may be used to implement an efficient single-cycle atomic root snapshot. The FPGA 10 also contains a relatively large amount of configurable routing resources for connecting the slices, based on the data flow in a hardware description language program. The routing resources are used by a place-and-route (PAR) tool during hardware synthesis.

The FPGA 10 may employ block random access memory (BRAM), which are specialized memory structures that are usually available on FPGAs. For example, some types of FPGAs may have a BRAM capacity of between 1.5 MB to 8 MB of BRAM. One feature of a BRAM type memory is that BRAM may be organized in various form factors (i.e., analogous to word sizes on a central processing unit). One commercially available example of an FPGA is the Virtex®-5 FPGA manufactured by Xilinx Inc., headquartered in San Jose, Calif. The Xilinx Virtex-5 LX330T device (one of the largest in that family) has a BRAM capacity of 1.5 MB; the latest generation of Xilinx devices, the Virtex-7, have as much as 8 MP of BRAM.

On the Virtex®-5, form factors of 1, 2, 4, 9, 18, 36, 72, and so on are supported. For example, a 36 KB BRAM can also be used as two logically separate 18 KB BRAMs. Moreover, a denser memory structure may be built by cascading multiple BRAMs horizontally, vertically or, in a hybrid configuration. Any memory structure which is smaller than 18 KB would lead to quantization (i.e., in memory system parlance, this is referred to as fragmentation). The quantization may be considerable, depending on the logical memory structure in the design.

The BRAM may be used as a true dual-ported (TDP) RAM (shown in FIG. 2 as port A and port B) that provides two fully independent read-write ports. A dual-ported memory has ability to simultaneously read and write to different memory cells at different addresses. Moreover, each port on the BRAM memory supports either read, write, read-before-write, and read-after-write operations. It should be noted that the BRAM may also be configured for use as a first in first out (FIFO) queue rather than a random access memory, which is used in the trace engine 22.

Figure 2:
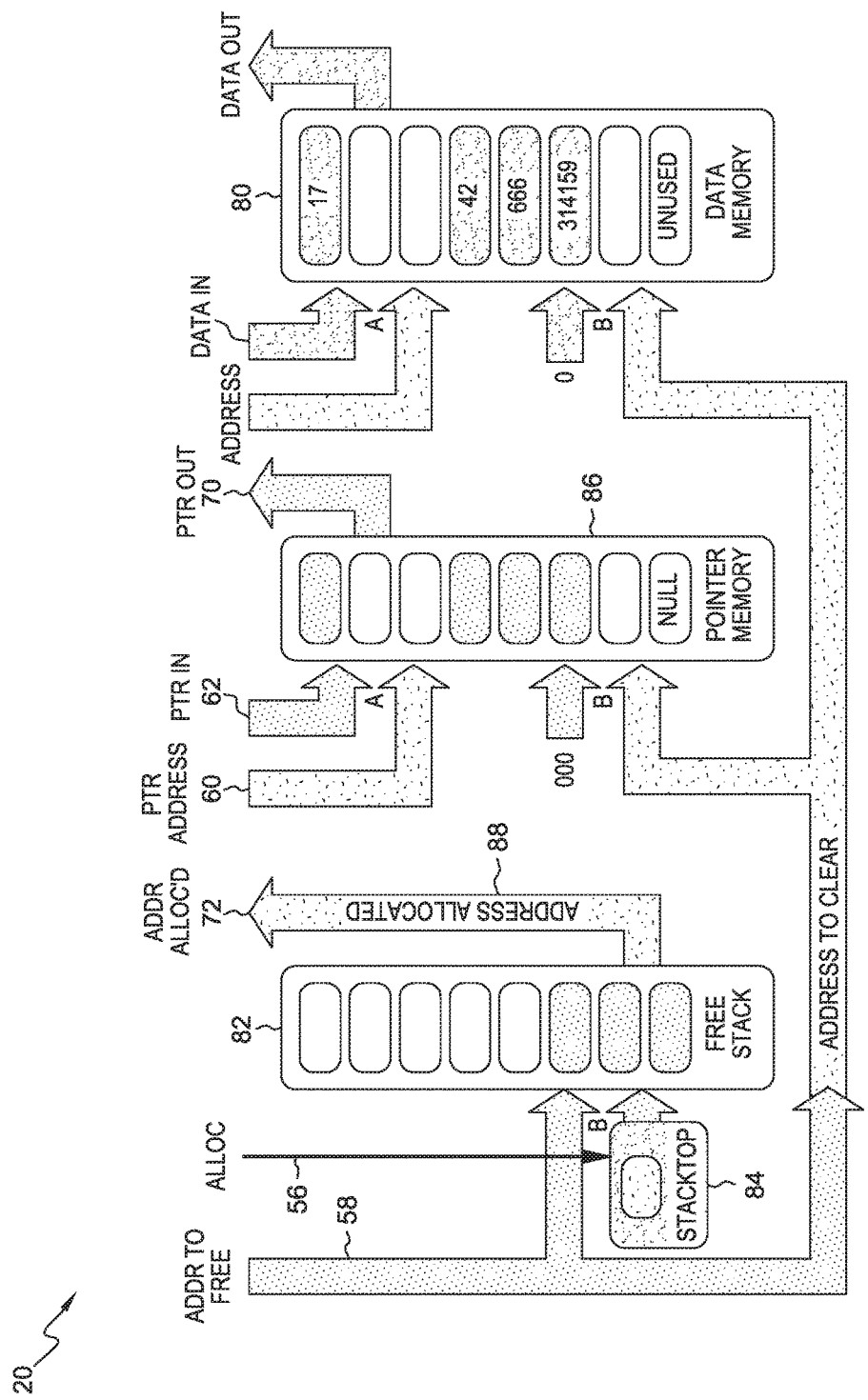
FIG. 2 is a block diagram of a memory module shown in FIG. 1 in accordance with an embodiment of the present invention.

The FGPA 10 includes memory structures (e.g., the memory 80 and 82 as illustrated in FIG. 2) that are typically more uniform than conventional software heaps. In embodiments of the invention, the memory structures in the FPGA 10 are organized into two or more miniheaps, in which objects have a fixed size and shape in terms of pointer and data fields. Each miniheap has an interface allowing objects to be allocated (and freed when using explicit memory management), and operations allowing individual data fields to be read or written. Miniheaps with one or two pointer fields and one or two data fields are generally employed. The quantization as described above may impact efficiency of BRAM utilization. For example, for a miniheap of size N=256, pointers are 8 bits wide, so a single 18 KB BRAM configured as 9 bits wide would be used. However, this wastes 1 bit per entry, but also wastes 1.75K entries, since only 256 (0.25K) entries are needed. The 1 bit wasted per field is a form of internal fragmentation and the 1.75K wasted fields are a form of external fragmentation.

To reduce external fragmentation, multiple fields of the same size may be implemented with a single BRAM set. However, since BRAMs are dual-ported, supporting more than two fields would result in a loss of parallelism in terms of field access. Furthermore, since one BRAM port is used for initialization of fields when allocated, this effect comes into play even with two fields. The opposite approach is also possible: multiple fields can be implemented with a single BRAM set, resulting in a wider data width. In principle this can reduce internal fragmentation. However, in practice, this actually can result in poorer resource allocation because it reduces flexibility for the synthesis tools.

The memory module 20 receives an allocation request 56, an address to free port 58, an address to read/write port 60, and a pointer to write port 62. The allocation request 56 may be a one-bit signal that is used to implement a malloc operation (e.g., dynamic allocation), and is received from a host (not shown) through the first application interface 30. The address to free port 58 is in communication with the sweep engine 24, and the address to read/write port 60 and the pointer to write port 62 are in communication with a host (not shown) through the first application interface 30. The memory module 20 sends a pointer value 70 to the trace engine 22.

With reference to FIGS. 1 and 2, a description will be given of the way in which objects with pointers in high-level programs are mapped to memory in the FPGA's block RAMs. There are of course many possible variations, but the description given below may form the basis of the garbage-collected memory managers in embodiments of the invention.

A block diagram of the memory module 20 is illustrated in FIG. 2, showing primary data and control fields. Various approaches exist for implementing the miniheap as described above. Fundamentally, the miniheap represents a time/space (and sometimes power) trade-off between the number of available parallel operations, and the amount of hardware resources consumed. Regarding the FPGA 10 shown in FIG. 1, a logical memory block with a desired data width and number of entries is specified, and the synthesis tools attempt to allocate the required number of individual block RAMs as efficiently as possible, using various packing strategies. The BRAMs for such a logical memory block are referred to as a BRAM set. In the various embodiments as described, one BRAM set is used for each field in the object. For example, if there are two pointers and one data field, then there are three BRAM sets. The non-pointer field has a natural width associated with its data type (e.g., 32 bits). However, for a miniheap of size N, the pointer fields are [$\log_2$ N] bits wide. Thus, because data widths on the FPGA 10 are customizable, the precise number of required bits are used. Thus, a larger miniheap will increase in size not only because of the number of entries, but also because the pointer fields become larger. It should be noted that the memory module is the same as in software, where the pointer value 0 is reserved to mean "null", so a miniheap of size N can really only store N−1 objects.

As shown in FIG. 2, all objects of a given type are mapped to a group of BRAMs, one per object field—a "column-based" layout. FIG. 2 shows a heap for objects with two fields: a pointer and an integer, which would correspond to a type like

--- struct LinkedListNode {
    LinkedListNode next;
    int data; }

---

There are a number of advantages to using one BRAM per field: (1) it allows simultaneous access to different fields in a single cycle, increasing parallelism; (2) field updates are atomic, and can therefore be performed in a single cycle, rather than using a 2-cycle read-modify-write operation; and (3) for larger memories where many physical BRAMs are cascaded to form a large logical BRAM, segregating the fields reduces the amount of cascading which increases the achievable clock frequency.

Thus for each field there is an input which is the address of the object (Ptr Address or Data Address), an input which is the new value when writing (Ptr In or Data In), and an output which is the value when reading (Ptr Out or Data Out).

FIG. 2 shows a heap 80 with 8 objects (with object 0 reserved for null). Therefore pointers are only 3 bits wide. In general, the ability to customize the pointer width using the variable word size of BRAMs can save considerable memory over a general-purpose CPU in which all pointers are the same size.

The memory allocation and de-allocation is handled by using a separate BRAM as the Free Stack 82. At initialization time, all pointer values (except 0) are pushed onto the free stack. The Stack Top register 84 points to the top of the stack.

An allocation is requested by setting the one-bit Alloc signal 56 to 1 for one clock cycle. In this case, the Stack Top register is decremented, and the pointer at the top of the stack is returned via the Addr Alloc'd port.

In fact, since the top-of-stack value can be "registered," an Alloc operation can be performed with a 0-cycle delay—that is, it can compute with the allocated address in the same cycle that it is allocated, and one object can be allocated in every clock cycle.

To de-allocate an object, its pointer is presented on the Addr to Free port. The address is stored into the Free Stack BRAM and the Stack Top is incremented. In addition, using port B of the BRAMs containing the object fields, the object is cleared using the Addr to Free 58 on the address lines and an input value hard-wired to 0.

For simplicity, in the design shown, port B of the heap BRAMs is reserved for use by the memory manager when it needs to clear a freed object. However, port B can also be used by the application as long as it does not free an object in the same cycle.

Alternatively, the application can take responsibility for clearing the memory, in which case the memory manager never needs access to the data fields.

Note that by using a threaded free list within the pointer memory 86, the need for a separate BRAM to hold the free stack could be eliminated. However, this would mean that allocate and free operations could not proceed in parallel with pointer read/write operations.

For clarity, a single object field memory 86 is illustrated in FIG. 2, which is of pointer type, and is stored in a single BRAM set. A second set of memory 82 (e.g., a free stack of memory) is also provided to store a stack of free objects. Both the memories 86 and 82 include a dual-port configuration (e.g., having a first port A and a second port B).

The allocation request 56 is sent to a stack top register 84, which is used to hold the value of a stack top of the second set of memory 82. Assuming the value of the stack top register 84 is a non-zero value, the stack top register 84 is decremented and sent to port B of the memory 82, in read mode. A resulting pointer 88 from the memory 82 is also sent to the address allocated port 72. A write value of the resulting pointer 88 is hard wired to null (e.g., '000'). To free an object, a pointer (e.g., the address to free signal 58) is presented to the memory module 20, and the stack top register 84 is used as the address for the memory 82 on port B, in write mode, with the data value of the address to free signal 58. The stack top register 84 is incremented, which causes a pointer to the freed object to be pushed onto the freed stack of memory 82.

In order to read or write to a field in the pointer memory 86, the address to read write signal 60 is presented, and if writing the pointer to write signal 62 is presented. This utilizes port A of the memory 86 in either read or write mode, resulting in the pointer value 70 in the write mode. Thus, as shown in FIG. 2, the memory module 20 can allow a read or write to proceed in parallel, which is allowed by the dual-ported memories 86 and 82.

As mentioned above, in embodiments of the invention, the hardware collector comprises three components: snapshot support, a marking engine, and a sweeping engine.

The root snapshot engine 26 may use a Yuasa-style snapshot-at-the-beginning algorithm (i.e., an algorithm that uses the snapshot-at-the-beginning strategy to preserve every reference at the beginning of garbage collection, and new objects allocated during garbage collection are also preserved). A root snapshot may be obtained virtually without stopping an application while the snapshot is taken. The root snapshot engine 26 takes two types of roots from one or more mutators, those in the registers and those in the stack.

Figure 3:
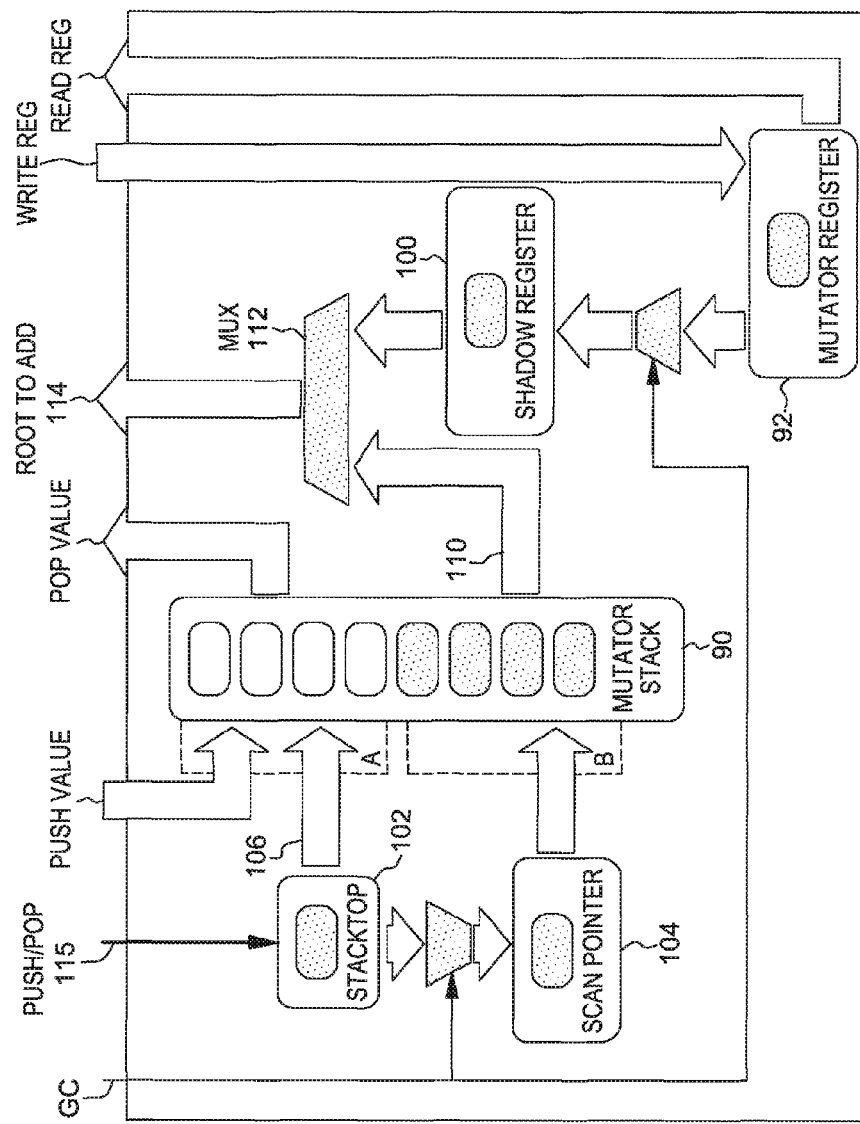
FIG. 3 is a block diagram of a root snapshot engine shown in FIG. 1 in accordance with an embodiment of this invention.

With reference to FIG. 3, the root snapshot engine 26 is illustrated with a single mutator stack 90 and a single mutator register 92. The snapshot is controlled by a garbage collector (GC) signal sent from the sweep engine 24 (shown in FIG. 1). The GC signal goes high for one clock cycle at the beginning of collection. The snapshot of the roots is defined as the state of memory at the beginning of a next cycle after the GC signal goes high. A snapshot of the mutator register 92 is obtained by using a shadow register 100. In the cycle after the GC signal goes high, the value of the mutator register 92 is copied into the shadow register 100. This can happen even if the mutator register 92 is also written by the mutator in the same cycle, since the new value will not be latched until the end of the cycle.

The stack snapshot is obtained by having another register in addition to a stack top register 102, which is referred to as a scan pointer register 104. In the same cycle that the GC signal goes high, the value of a stack top register pointer 106 minus one is written into the scan pointer register 104 (because the stack top points to the entry above the actual top value). Beginning in the following cycle, the scan pointer register 104 is used as the source address to port B of the mutator stack 90, and a pointer 110 is read out, going through a multiplexer 112 (MUX) and emerging on a root to add port 114 from the snapshot module. The scan pointer register 104 is also decremented in preparation for the following cycle. It should be noted that the mutator can continue to use the mutator stack 90 via port A of the BRAM set, while the snapshot uses port B of the mutator stack 90. Moreover, because the mutator cannot pop values off the stack faster than a collector can read the values, the property is preserved that the snapshot contains exactly the roots that existed in the cycle following the GC signal.

In embodiments of the invention, a state machine (not shown) may be used to sequence the values from the mutator stack 90 and the shadow register 100 through the multiplexer 112 to the root to add port 114. It should be noted that the values from the mutator stack 90 are processed first, because the stack snapshot technique relies on staying ahead of the mutator without any explicit synchronization. If multiple stacks are provided, then a shadow stack will be provided to hold values as they were read out before the mutator could overwrite the hold values, which could then be sequenced onto the root to add port 114.

One embodiment of the invention comprises a hardware garbage collector that supports an arbitrary (fixed) number of pointers per object.

The hardware collector of this embodiment comprises three components: snapshot support, a marking engine, and a sweeping engine.

When available memory falls below a certain threshold, a GCsignal is asserted which triggers a snapshot and begins the collection process.

For the snapshot, we use the design of Bacon et al. There are two cases: roots in registers and roots on a stack. For registers that contain pointers, we allocate a shadow register. When the GC signal goes high the values in pointer registers are copied into the shadow registers (using read-before-write). These registers are then fed into the marking engine, one per cycle.

If there is a stack, the pointers are read out and fed to the marking engine, one per cycle. This begins immediately, and since at most one value can be popped from the stack at a time, the process of collecting the roots can stay just ahead of the application.

Figure 4:
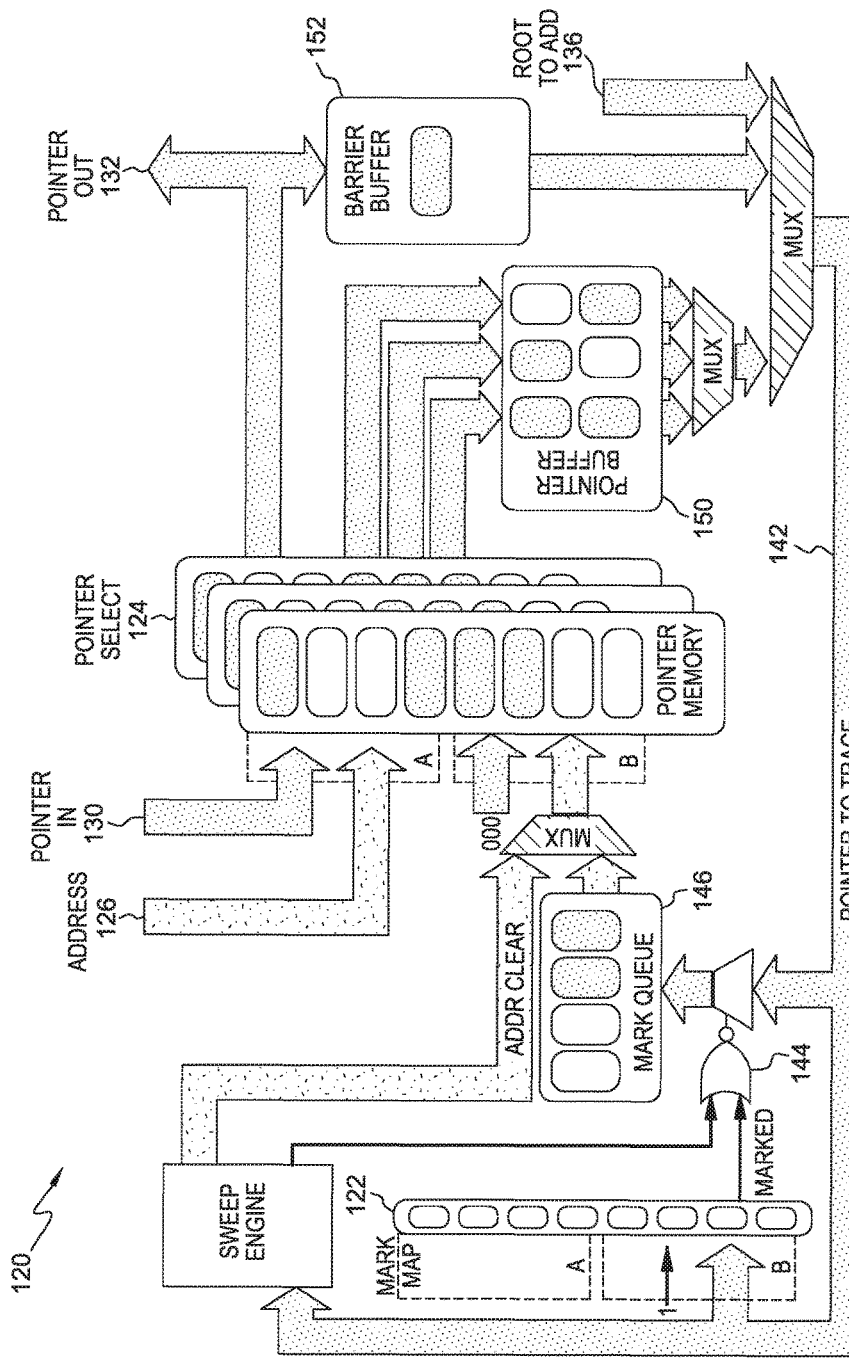
FIG. 4 is a block diagram of half of a single-heap marking engine in accordance with an embodiment of the invention.

The marking engine comprises two (almost) identical halves, one of which is shown at 120 in FIG. 4 (not all aspects of the design are shown; the diagram is intended to provide a high-level understanding of the design). The two halves each make use of one port of the Mark Map 122, which is the fundamental data structure of the garbage collector.

The external interface to the application comprises three inputs, Pointer Select 124, which selects which of the pointer BRAMs to access, Address 126 and (used for write mode) Pointer In 130, and one output (used for read mode), Pointer Out 132. In addition, the roots of collection are supplied via the Root to Add 136 input.

Each pointer field is stored in its own BRAM in pointer memory 140. For a heap of N objects with P pointers per object, there are P BRAMs of width log N bits (so that all N objects can be addressed). FIG. 4 shows the case when N=8 and P=6 (since there are two halves to the mark engine, this portion only contains three pointer BRAMs).

The mark engine begins work when the first root pointer arrives on the Root to Add input 134. The root has priority on the MUX and flows along the path labeled "Pointer to Trace" 142.

The mark phase must keep track of which objects are "live", both to ensure that they are not subsequently freed and also to prevent them from being reprocessed if they are pointed to by multiple objects.

The Mark Map 122 is a 1-bit wide BRAM of size N. The "Pointer to Trace" is looked up in the mark map and then set unconditionally to 1. If the value read was 1, it was already marked and does not need to be processed. If the value read was 0, it was unmarked and may need to be processed.

The "Pointer to Trace" is also fed to the Sweep Engine (described in detail below), which is responsible for allocating and freeing memory. It maintains a used Map which records whether an object has been newly allocated (denoted "Black") during this collection cycle. This value is returned to the mark engine.

If the results of both the Mark Map and Used Map lookups are 0 (that is, the object is neither Marked nor Black), then this is a pointer that must be traced. The NOR gate 144 controls the write-enable signal on the Mark Queue 146, which is a BRAM FIFO of size N/2 containing pointers that need to be traversed.

When either mark queue is non-empty (and there is no back-pressure), a pointer is dequeued from the less empty of the two queues and looked up in all of the pointer memories 140 using port B (port A is reserved for the application). The result is P new pointers that need to be looked up in the mark map and (potentially) traced. These are fed into Pointer Buffer 150, which is a small queue of depth 4 (determined by the overall pipeline depth). Since a significant number of pointers may be null, a valid mask (not shown in the figure) is also calculated indicating which of the fields actually need to be processed. When the occupancy of the Pointer Buffer exceeds 2, back-pressure is applied to the Mark Queue so that the buffer is not overflowed.

When a set of pointers is dequeued from the Pointer Buffer 150, the valid mask is used to extract the next two non-null pointers. One is fed to each of the two halves of the mark engine as the next "Pointer to Trace", and the process repeats itself.

Meanwhile, if the application writes a pointer value using port A, the old pointer that it over-writes must be traced in order to maintain the snapshot property of garbage collection (otherwise, we might fail to traverse objects that were live in the snapshot). Using read-before-write mode of BRAM, the old pointer is retrieved and placed in the Barrier Buffer 152. When the barrier buffer is full, it pre-empts pointers coming from the Pointer Buffer and a pair of pointers are removed and supplied as the "Pointer to Trace" pair.

Pipeline Optimization: The marking pipeline requires the use of four cycles for the memories it uses in sequence: Mark Map/Used Map, Mark Queue, Pointer Memory, and Pointer Queue (as shown in FIG. 4). To reduce the combinational path delays we introduce two additional pipeline stages (not shown in FIG. 4). The first one is between the Pointer Memory and the Pointer Queue. The second one is between the large mux 156 and the Mark Map.

In normal operation, since the design is fully pipelined each half-engine is able to trace 1 pointer per cycle. However, some heap topologies may result in stall cycles. For instance, if the heap consisted entirely of a single linked-list data structure, each object would result in several stall cycles since there would never be more than one object in the Mark Queue at a time.

Therefore, it is highly desirable to minimize the number of pipeline stages. In two cases, the Mark Queue 146 and the Pointer buffer 140, since they are just operating as buffers we can introduce a by-pass data path which feeds a new value directly to the output of the queue when it is empty. This does not change the physical number of pipeline stages, but allows 2 of the stages to be skipped when the engine is under-utilized.

In the case when there are only one or two pointers per object, we can remove the three pipeline stages between the Pointer Memory 140 and the Mark Map 122, since we do not need to sequence through the pointers in the object—we can feed them directly into the Mark/Used Map lookups. As a result, when P≤2, our design has a three stage pipeline, but the by-pass operation on the Mark Queue removes half of the stall cycles in the worst case.

Termination: One of the most challenging parts of any garbage collector is the termination algorithm for the mark phase: since the application continues to allocate objects and write to the heap, how can we guarantee that marking is done?

We implement termination as follows: when the Mark Queue is empty (and there is no by-passed pointer available), we start a counter that is incremented in every clock cycle. If no new pointers are inserted into (or by-passed around) the Mark Queue after t cycles, then marking is complete.

The value we choose for t has to be sufficient to process any pointers in the last object that we dequeued, as well as any pointers in the write barrier buffer at that time. Since marking is a monotonic, idempotent process, once we process the last object and it results in no new objects, we know that we are done.

If the marking pipeline contains a stages, and there are P pointers per object, then a sufficient bound on termination is t=σ+P.

Note that this is much simpler than the algorithm of Bacon et al., since in the presence of high-frequency pointer writes that system may be prevented from terminating as newly allocated objects are repeatedly placed in the mark queue.

Figure 5:
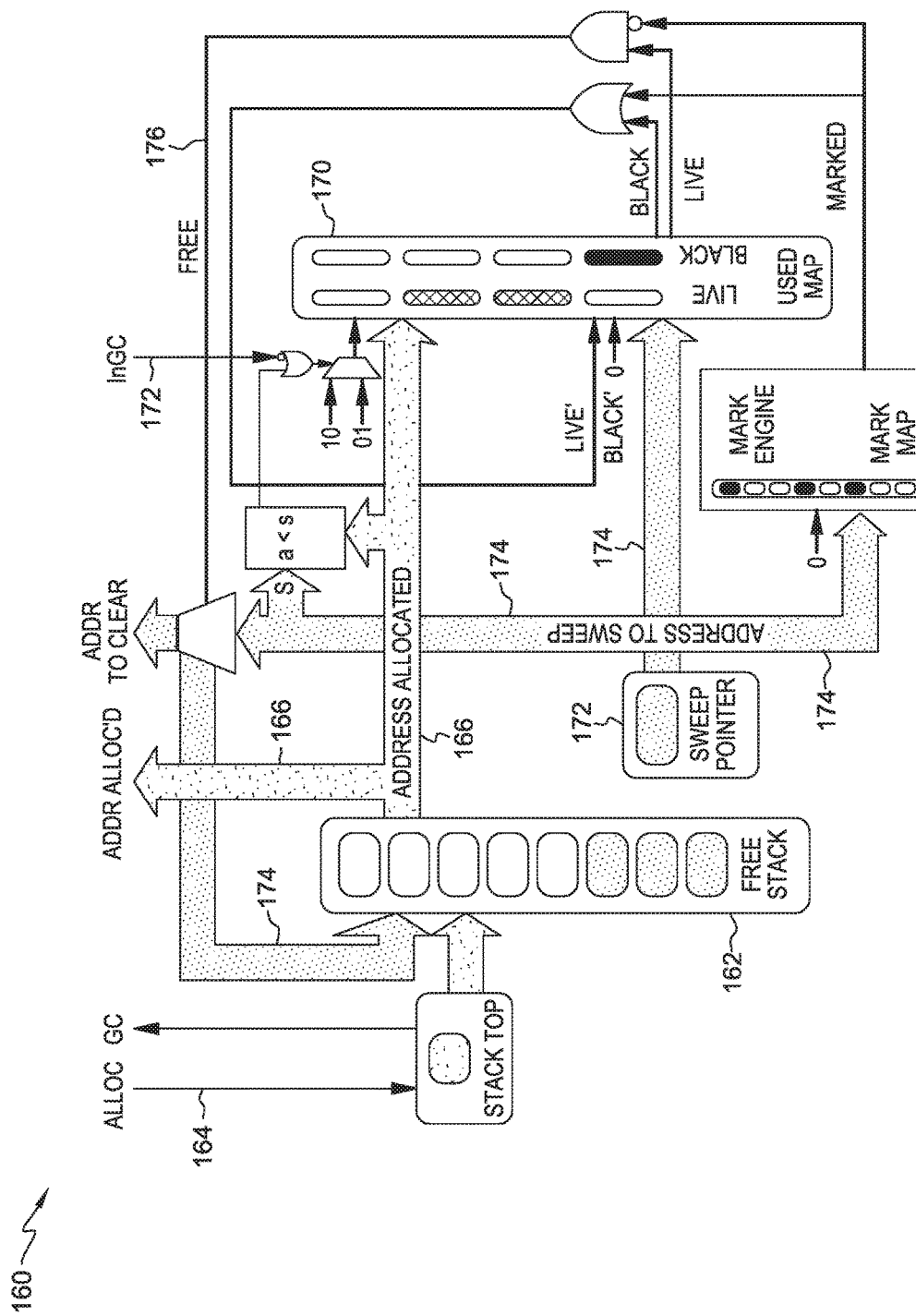
FIG. 5 is a block diagram of free stack and sweeping engine used with the marking engine of FIG. 4 in an embodiment of the invention.

The sweep engine handles both allocation and freeing, and is shown in FIG. 5 at 160. The sweep engine is very different from the Bacon et al. garbage collector, both to support the new termination algorithm described above, and also because it cuts the cycles required for sweeping by as much as ½.

The Free Stack 162 contains the addresses of all free objects. When the application needs to allocate an object, it asserts the Alloc signal 164 for one cycle. The address pointed to by the Stack Top register is returned to the application in the same cycle as Addr Alloc'd 166.

The "Address Allocated" is also fed into the Used Map 170, which keeps track of the allocation status of each object. There are three possible states for each object: Free (00, shown as white in the figure) indicates that the object is not in use, and therefore its pointer is on the free stack. Black (01, shown as black in the figure) indicates that the object was freshly allocated during collection, and therefore can not be collected until the next garbage collection. Live (10, shown as gray in the figure) indicates that the object was either marked during the previous collection, or allocated between the end of the previous collection and the beginning of the current one.

When collection is off, newly allocated objects are unconditionally set Live in the used Map using port A, which is dedicated to the allocator. The case when collection is on is more subtle, and is discussed below.

Once marking has terminated, all objects that were live when collection started (that is, that were part of the logical snapshot) will have been marked. We then commence the sweeping phase. Sweeping requires that we iterate through all N objects and decide whether they are live, and if not, whether they need to be freed.

Since port A of the Used Map 170 is dedicated to allocation, and we need to perform a read-modify-write of the Used Map, sweeping one object takes two cycles, $c_0$ and $c_1$. In order to minimize sweeping time, we therefore split the map into even and odd banks, and process both banks in parallel. This restores our sweeping throughput to one object per cycle. For clarity of presentation, FIG. 5 only shows one bank.

In cycle $c_0$, the value of the Sweep Pointer register 172 is used as the "Address to Sweep" 174 and presented to port B of the Used Map, and also for the Mark Map in the Mark Engine. As a result, we have three bits of information about the object: Live, Black, and Marked. These are used to decide whether the object is to be freed, as well as the new values for the Used Map, which are written back in cycle $c_1$:

Live'←Marked∨Black
Black'←0
Free←Live ∧ ¬Marked

That is, an object is considered to be live after collection either if it was marked (part of the snapshot) or black (allocated during collection). The Black bit and the Mark are always cleared by sweeping so they are properly initialized for the beginning of the next collection.

An object is discovered to be garbage if it was previously live, but was not marked. In this case, in cycle $c_1$ the "Free" signal 176 causes the "Address to Sweep" 174 from cycle $c_0$ to be written into the Free Stack 162 and the Stack Top register is incremented. The freed address is also sent to the Mark Engine as Addr to Clear (see FIG. 4), where it is fed to port B of the pointer memories in order to zero them (port B is free since marking and sweeping are never active at the same time). As a result the application does not need to waste time initializing newly allocated objects.

We now return to the matter of setting the bits in the Used Map 170 when an object is allocated. The input signal InGC tells us whether garbage collection is active, and if it is false, the MUX 180 selects the value 10 to write in the Used Map—that is, when collection is off we always allocate objects in the Live state. On the other hand, if collection is one, then if an object has not yet been swept (the allocated address a is less than the sweep address s) then it has already been processed by the sweeper and should be allocated Live; otherwise it has not yet been swept and must be allocated Black.

In a second embodiment of the invention, to implement a program with a variety of data types, of potentially drammatically different shape, the memory system is implemented as several heaps of the kind described above. The number of such heaps is denoted as H.

With respect to any particular heap, it is denoted as the local heap, the other heaps as foreign heaps.

Pointers are comprised of a heap index and an object index. Since heaps are allowed to point to each other in arbitrary fashion, a uniform pointer type is used across all heaps. If there are H heaps each of which has $N_i$ objects, then a pointer contains $[\log_2 H]$ bits for the heap index and $[\log_2 \max_i N_i]$ bits for the object index.

Other ways of representing pointers are possible, and may be optimized in conjunction with compiler knowledge of data types.

Handling multiple heaps is almost entirely a matter of the mark phase. In the case of a statically typed language, it is known statically which heap each register may point to. Therefore, once the snapshot has been taken, roots are simply sequenced to each individual heap to which they belong.

Sweeping, since it is essentially just a linear traversal of the mark map and the black map, is a purely heap-local operation. Once it is determined that marking has (globally) terminated, sweeping is initiated in each of the individual heaps, which proceeds in parallel. Garbage collection terminates when all heaps have been swept.

Supporting multiple heaps comprises two aspects: (1) extending the single-heap mark engine to handle pointers to and from foreign heaps, and (2) an interconnect to route pointers between the mark engines.

Figure 6:
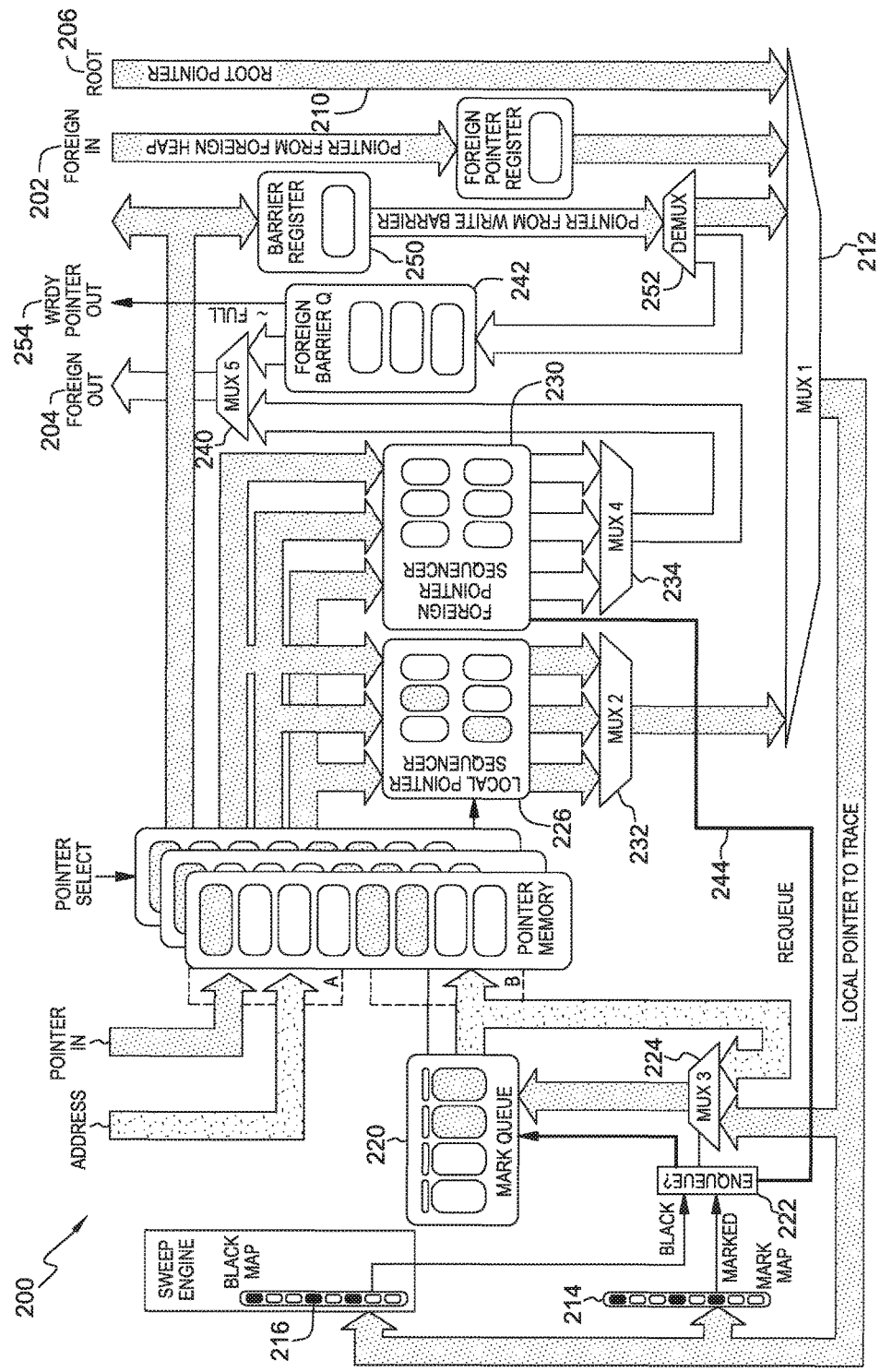
FIG. 6 is a block diagram of a plural heap mark engine in accordance with an embodiment of the present invention.

The extended mark engine design is shown in FIG. 6 at 200. The heap can now hold both local pointers and foreign pointers. However, each heap takes care of marking only its local pointers.

The two fundamental changes to the interface of the heap are the Foreign In port 202 and the Foreign Out port 204. These are not user-visible, but are used to connect the local heap to its foreign heaps. When the mark engine encounters a foreign pointer, it must be routed to the correct foreign heap.

The routing itself is handled by a central component external to the mark engine, called the Mark Router, which is described below. The responsibility of the mark engine is to accept and provide foreign pointers to the Mark Router.

As with the single-heap collector of FIG. 4, marking begins with the arrival of the first root on the Root interface 206. This is guaranteed to be a local pointer. The root pointer 210 flows through MUX 1 212 and is looked up in the mark map 214 and the black map 216. Since it is the first root, it will be unmarked; assuming it was not allocated in the last few cycles (since the collection was triggered), it will also not be black. Therefore it should be added to the mark queue 220.

Because of foreign pointers, the enqueueing logic is more complex, as represented by the "Enqueue?" module 222 and MUX 3 224. The mark queue 220 also contains an additional bit for each entry, the "foreign bit," which will initially be 0.

When a pointer is dequeued from the mark queue, it may contain a mixture of local and foreign pointers. This is handled by having two sequencers, a Local Pointer Sequencer 226 and a Foreign Pointer Sequencer 230. The pointer fields of each object are fed into both sequencers.

The Local Pointer Sequencer performs the same function as the Pointer Sequencer in the single-heap design (FIG. 4). However, any foreign pointers are simply treated as if they are nulls. The local pointers now flow through MUX 2 232 and then MUX 1 and the local marking process continues.

The Foreign Pointer Sequencer 230, on the other hand, masks out the local pointers. When this sequencer processes an object, it successively selects the next non-null foreign pointer field via MUX 4 234. Thence it is routed to the Foreign Out port 204 via MUX 5 240.

However, these pointers have lower priority than foreign pointers from the write barrier, as described below. The write barrier is given priority to avoid pre-empting the mutator.

At some later point, when the Foreign Barrier Queue 242 is empty and the Mark Router is able to send the pointer to its heap, the pointer will be sent to the foreign heap via the Foreign Out interface 204.

On the incoming side, each mark engine 200 gives priority first to local write barrier pointers, second to roots (not present during most of marking), third to pointers arriving on the Foreign In port, and finally to the local pointer sequencer.

When the foreign pointer sequencer emits a foreign pointer, it could be sent to the foreign heap as soon as the next cycle. But it may also be pre-empted for some time by the foreign barrier queue 242. Even then, it is possible that all H−1 heaps will come across a foreign pointer to heap $H_i$ in the same cycle. In this case, there may be a delay.

There may be circumstances when the Foreign Pointer Sequencer 230 is full, and another object is being processed which contains foreign pointers. Under these circumstances, fundamentally, there are three options: (1) block the mark engine until more pointers are sent to the foreign heap, making space in the sequencer; (2) increase the buffering of foreign pointers by increasing the size of the queue inside the sequencer; or (3) re-enqueue the object in the local mark queue and re-process it later, when there will be bandwidth available to the foreign heap(s).

In embodiments of the invention, the latter option is preferred.

Blocking the mark engine is less preferred because it is possible that the global marking operation could deadlock, with heaps waiting on each other. With a clever design of the Mark Router and careful analysis, it might be possible to design a system that is free of deadlock. But it may still be subject to delays.

This problem could be ameliorated by having a substantial queue inside the foreign pointer sequencer, instead of just a few objects. But this simply postpones the delays, and large queues must be synthesized as BRAMs, effectively increasing the memory cost of garbage collection relative to manual memory management.

Thus when an object with foreign pointers is encountered and the foreign pointer sequencer is full, the Requeue signal 244 is asserted, which causes the original object pointer to be selected from MUX 3 and stored in the mark queue. When this happens, the "foreign bit" of that mark queue entry is also set. This has no effect on the Local Pointer Sequencer, so all local pointers in the object will be marked and traced (if needed).

This guarantees that local heaps always make progress tracing their local pointers. As a result, they will eventually have spare cycles to accept pointers from foreign heaps, and global progress is assured.

When a pointer is dequeued from the Mark Queue and its foreign bit is set, the Local Pointer Sequencer 226 simply discards the contents of its fields, so they are not re-traced. The Foreign Pointer Sequencer 230, on the other hand, processes the fields just as it normally would.

Note that when a pointer is re-processed with its foreign bit set, the pointer values in the object it points to might have changed. However, if they have, they would have been caught by the write barrier. So this would not violate the snapshot invariant.

Handling write barriers is a challenging aspect of the multi-heap collector. Since a Yuasa barrier is used, the barrier must record the old value of the field, which could be a foreign pointer. So even though each heap individually can handle one write barrier pointer per cycle (if they are all local pointers), it is possible that in a single cycle, all pointers that are over-written will be to the same heap $H_k$.

When an overwritten pointer in the Barrier Register 250 needs to be processed, it flows through the DEMUX 252 which routes it through MUX 1 if it is a local pointer. However, if the pointer is a foreign pointer, it is enqueued in the Foreign Barrier Queue 242. As discussed above, this queue has priority over the Foreign Pointer Sequencer, since it is preferred to throttle the collector rather than the mutator.

The presence of the barrier queue 242 makes it possible to absorb short-term bursts in the mutation rate when those mutations all have to be routed to the same heap. Ultimately, however, this queue will fill up.

Thus in the worst case the mutation rate of the application might have to be throttled. However, in many cases the compiler will have knowledge of data types and be able to determine statically that the number of possible foreign write barriers is below the limit. An algorithm akin to VLIW scheduling [W. J. Schmidt and K. D. Nilsen. Performance of a hardware-assisted real-time garbage collector. In ASP-LOS, pp. 76-85, 1994], where there are a fixed number of functional units that can be used in a cycle, could be applied.

As an alternative embodiment, "write ready" signal (WRdy) 254 is provided, which is true so long as the barrier queue is not full. When the barrier queue is full, the mutator may not write to this heap if there is any possibility that such a write will over-write a foreign pointer. In such a case, the compiler can generate a dynamic schedule that takes account of the WRdy signal.

This restriction applies only to pointers (data field access is unrestricted), and then only to writes, and only to fields that may point to other heaps. Given the natural serialization that pointer-based data structures impose, it seems unlikely that a real program could generate a sustained foreign-pointer write rate of many per cycle (bursts are not a problem since the barrier queue can absorb them).

Because a snapshot-based algorithm is used, the work that the collector must perform is bounded and termination can take advantage of this monotonicity property.

In one embodiment of the invention, the termination algorithm is as follows:
Each heap maintains a ready to terminate signal which is the and of the empty signals from the mark queues 220 and the local and foreign pointer sequencers 226, 230;
When all heaps assert ready to terminate, a start terminate signal is asserted to all heaps (if at any point in the termination algorithm any of the ready to terminate signals become false, the entire termination protocol is aborted). When all heaps are ready to terminate, they snapshot the state of their foreign barrier queue by recording its occupancy in a termination counter register;
Every time a pointer is removed from the foreign barrier queue, its termination counter register is decremented; when it reaches 0 it asserts a foreign barriers complete signal;
Once all heaps assert foreign barrier complete, a termination counter register is initialized to some value δ, which must be greater than the maximum delay in cycles from any foreign barrier queue to the pipeline stage in which pointers are enqueued into the mark queue. One example is to set δ=16.
The termination counter is decremented in every cycle. If it reaches zero and all heaps are still asserting the ready to terminate signal, then the mark phase has finished.

When there are exactly two heaps (which may not be an uncommon case), the Foreign Out port 204 of one heap is connected directly to the Foreign In port 202 of the other heap, and vice-versa.

When there are more than two heaps, they are connected in a "crossbar" pattern: each heap is connected to every other heap. Before the Foreign In port, there is a MUX that selects from the available foreign pointers from the other heaps. This MUX uses an eager round-robin discipline, to ensure that each heap is able to make progress in dispatching foreign pointers.

In an embodiment of the invention, the memory management unit is implemented in Verilog, a hardware description language (HDL). To evaluate the generated hardware for the collector, the design to an FPGA was synthesized and the consumption of logic and memory resources was reported, as well as the resulting clock frequency. The latter, in embodiments of the invention, is critical to achieving high performance.

The Xilinx Virtex-5 LX330T [Silinx. Virtex-5 family overview. Tech. Rep. DS 100, February 2009.] FPGA was used for the experiments which is the largest LXT device in the Virtex-5 family.

The Xilinx ISE 14.5 tool was used for synthesis. For each design point, complete synthesis was performed including place-and-route to get the synthesized clock frequency as reported by the tool.

In a simulation of an embodiment of the invention, the approach is to use bi-simulation. Programs were written or adapted in Java so that each allocation, read, or write is performed both in the JVM and also in the hardware collector running in a cycle-accurate simulator. The Java program maintains all pointers at both the Java level and the hardware collector level, and all reads are validated for consistency.

As a result, the programs can be modified to allocate objects in different hardware heaps, and simulate varying mutation and allocation rates. Because the hardware simulator is only performing the heap pointer operations, the rest of the calculations take zero time. In actual compiled code the pointer operations would be slowed to some extent by the rest of the computation. But with this method, maximum stress can be put on the collector.

Two micro-benchmarks are implemented: SortedList maintains a sorted linked list of objects; TreeSearch maintains a tree and performs insert, delete, and lookup operations.

Also, two of the JOlden benchmarks are adapted: TSP (travelling salesman) and EM3D (3-dimensional electromagnetic wave propagation).

These four benchmarks require 1, 2, 4, and 24 pointers per object, respectively. This allows various heap geometries to be tested, which can raise different issues in the design.

In order to evaluate the effect of multiple heaps in a systematic way, objects are artificially partitioned between several identical heaps. While this is artificial, a more realistic approach (such as putting different data types in different heaps) would only be applicable to a particular number of heaps.

For comparison purposes, a single heap instance of the multi-heap collector was initially synthesized, without any inter-heap routing. Subsequent measurements will show the separate effect of scaling the number of heaps.

FIGS. 7(*a*)-7(*c*) compare a single instance of the multi-heap collector with a simple Malloc ("Malloc") design, the collector of Bacon et al which only supports 2 pointers per object ("2-ptr Heap"), subsequent work which supports arbitrary number of pointers per heap ("General Heap"), and an embodiment of the collector described herein ("Multi-Heap"). In all cases, the heap was configured to contain 2 pointers so that direct comparisons can be made.

Figure 7A:
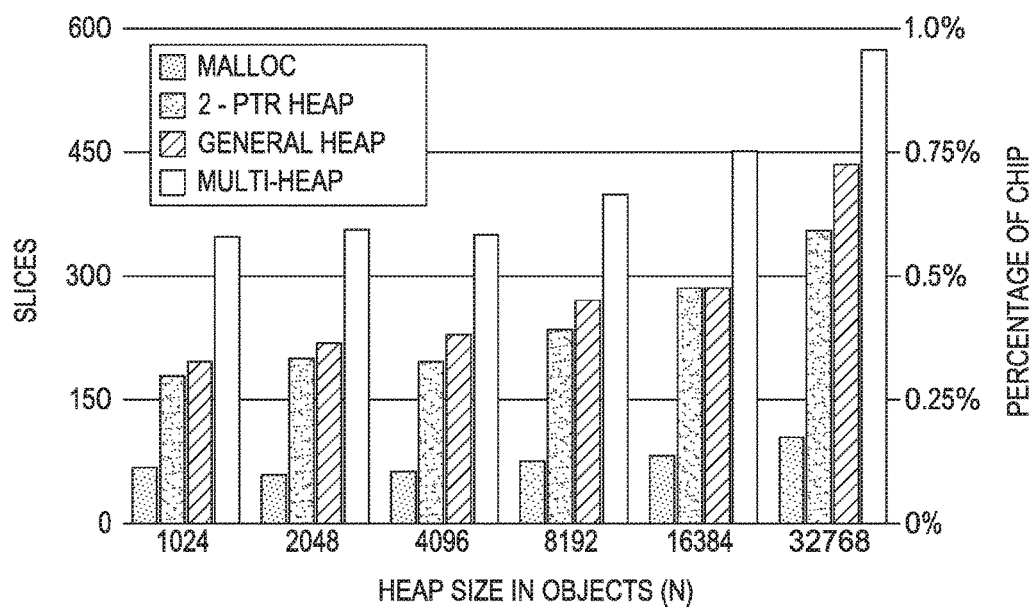
FIGS. 7(a), 7(b) and 7(c) show performance results of a garbage collector of an embodiment of this invention and three other garbage collectors, with various heap sizes.

FIG. 7(a) shows that the design of an embodiment of this invention consumes considerably more logic resources (in relative terms). However, even at 32K objects this design uses less than 1% of the logic resources of the chip. In addition, as the heap size increases, the relative additional cost of multi-heap support goes down.

Figure 7B:
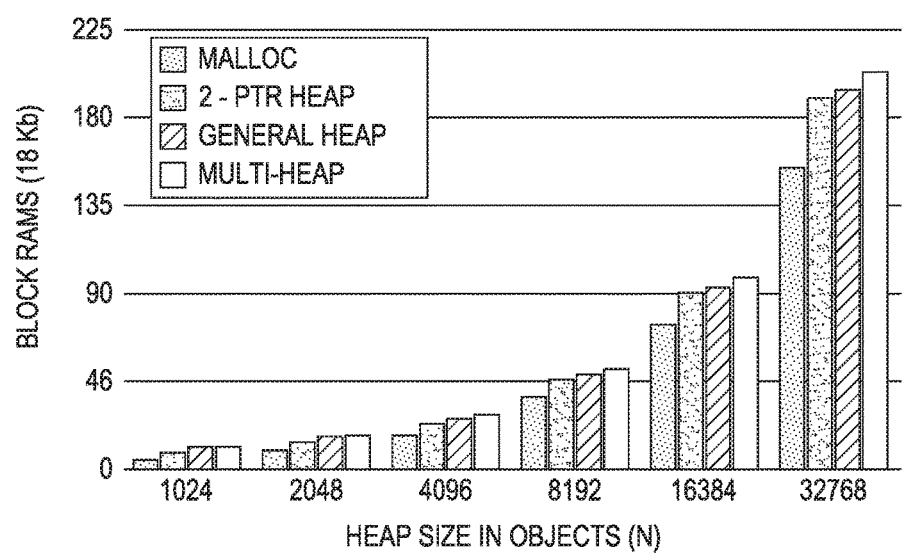

FIG. 7(b) shows the memory consumption in Block RAMs. All of the collectors pay a noticeable overhead relative to Malloc, but the multi-heap support consumes minimal additional memory.

Figure 7C:
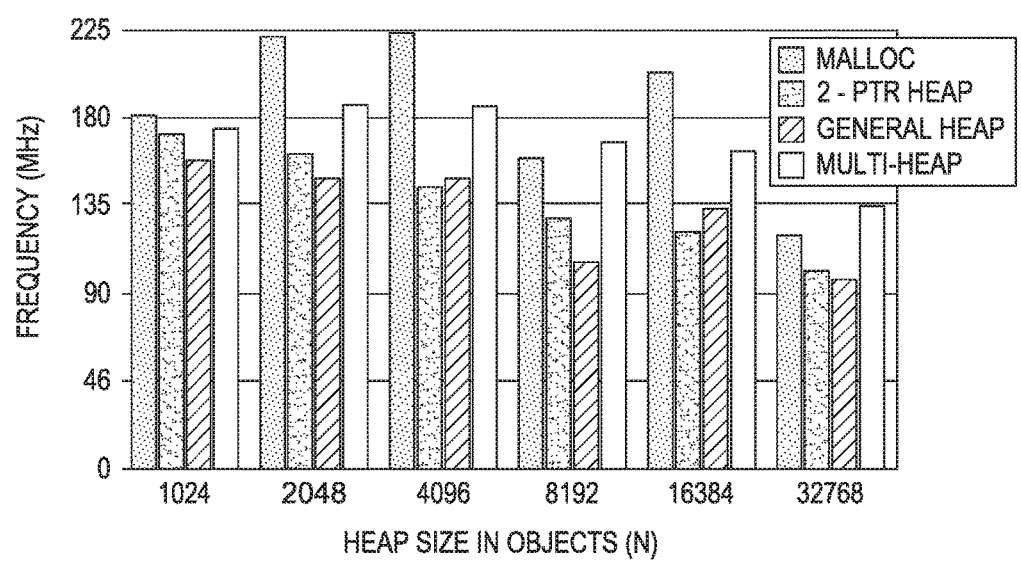

FIG. 7(c) shows the synthesized clock frequency achieved by the different designs. It is here that Malloc has an advantage over garbage collection. However, a decision was made to more aggressively pipeline the mark engine of the multi-heap design (using 7 stages instead of 3). This can have a negative effect on worst-case performance pathologies, but yields better overall performance in their absence.

Figure 8A:
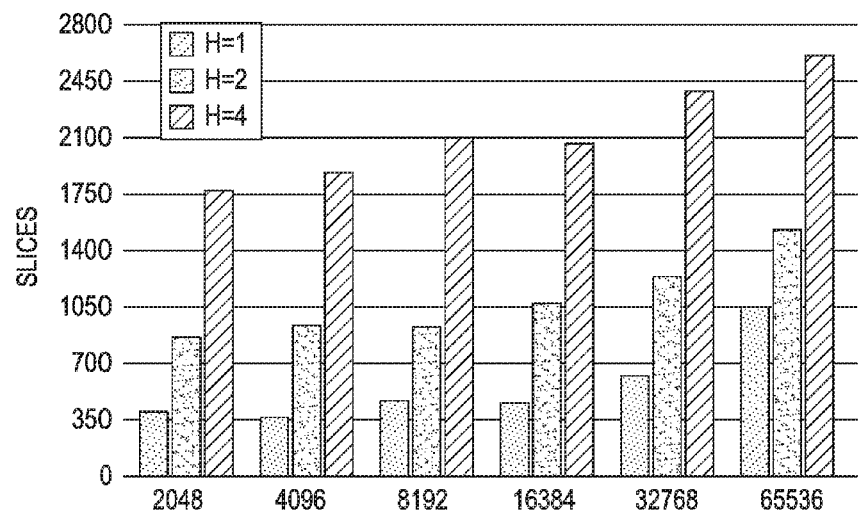
FIGS. 8(a), 8(b) and 8(c) present data that show the effects of embodiments of this invention for different numbers of heaps and different total heap sizes.
Figure 8B:
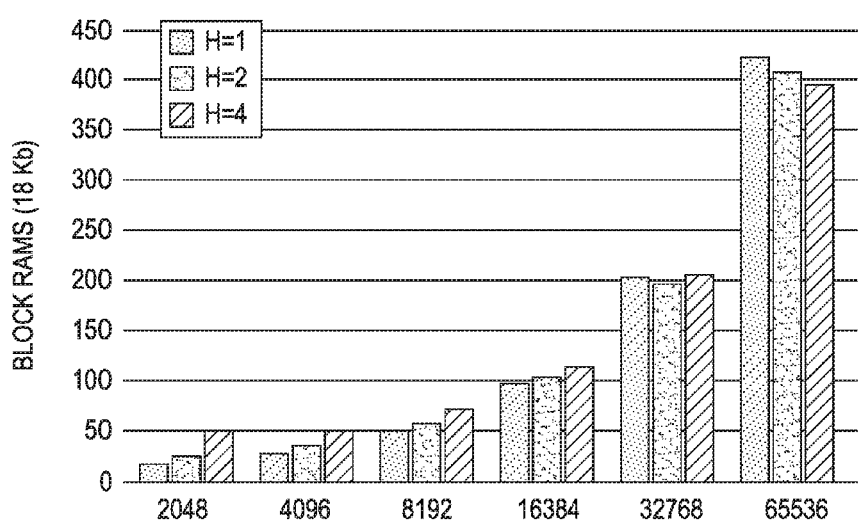
Figure 8C:
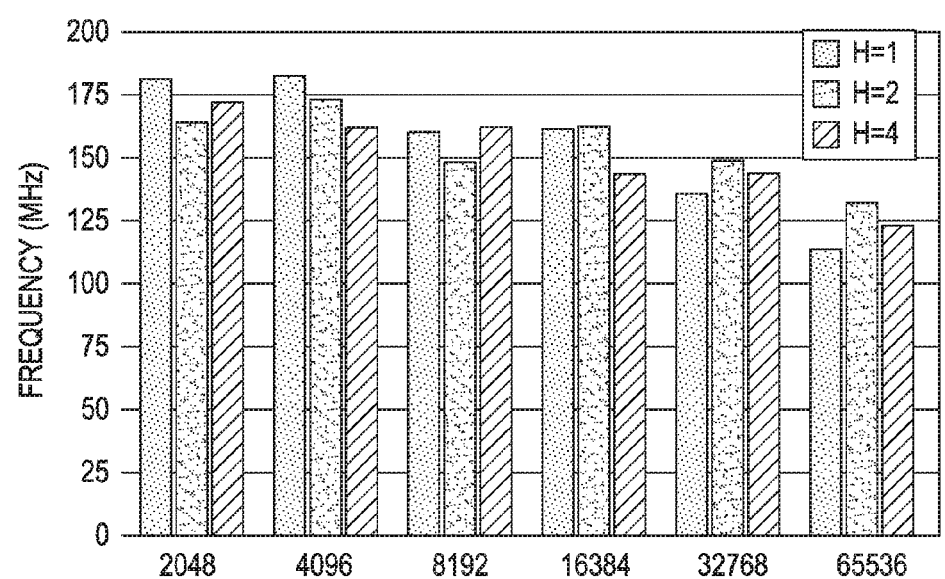

FIGS. 8(a)-8(c) present data that shows the effects of connecting multiple heaps. At each x-axis value, the total amount of memory is fixed, which is then spread evenly across 1, 2, or 4 heaps. In the case of two heaps, the general inter-connection network was avoided, and these two heaps were simply wired together directly.

FIG. 8(a) shows that the number of slices (logic resources) scales roughly linearly with the number of heaps. The routing network between the heaps when H=4 does not consume significant additional resources.

FIG. 8(b) shows the Block RAM usage. At small heap sizes, H=4 consumes considerably more memory. Part of this is accounted for by overheads associated with multiple collectors: 4 mark maps, 8 mark queues, and so on. However, the main factor is quantization effects: At 2K with H=4, each heap only contains 512 objects. These are insufficient to fill even a single BRAM; therefore, much of the space is wasted. In practice, one would always want to round heap sizes up so that they took advantage of these quantization effects to provide the largest heap possible.

At the largest heap sizes, there is an inversion in the memory trade-off.

FIG. 8(c) shows the effect on frequency of partitioning memory into multiple heaps. Generally speaking there is a modest degradation as the number of heaps is increased.

This may be due to the long wires and complex multiplexing required by the inter-connection of the heaps.

Each of the benchmarks was run under the bi-simulation infrastructure with 1, 2, and 4 heaps. At each size, an automated binary search was used to find the smallest heap size in which the application could run with 0 stall cycles (100% MMU), measured as a multiple of the maximum live memory of the application (within a factor of 0.025). Statistics for each benchmark at that heap size are reported in Table 1 of FIG. 9.

The minimum heap sizes are in general quite reasonable—from just under 1.1 to 1.7 times the maximum live data set. This is considerably less than is typically required by software real-time collectors, or even non-real-time collectors when tuned for throughput.

Maximum collection times ("Max GC"—in cycles) generally go down considerably as the number of heaps increases. This indicates that the multiple heaps are achieving significant useful parallelism in their mark engines.

The effects of parallelism are even more surprising given that the percentage of non-null pointers that are foreign ("Foreign Ptrs") varies from roughly 25 to 75%. Apparently each foreign pointer generates sufficient local work that there is some benefit.

On the other hand, the marking engines are stalled (have no pointers in their mark queues to process) a considerable fraction of the time ("Mark Stalled"). This is due to two factors: cross-heap pointers and the multi-stage pipeline of our design. However, this does not seem to harm the overall performance.

When foreign pointers cannot be sent to the remote heap, the object containing them must be re-enqueued in the local mark queue (as described above), leading to additional work.

The most significant effect is seen when the number of pointers per object increases, as with EM3D, which has 24 pointers per object. In this case, the foreign pointer sequencer becomes full and exerts back-pressure. In EM3D with H=4, there are 155 re-queues with a maximum collection time of 706 cycles. Note however that since there is a seven stage pipeline, the work of the re-queues can be overlapped with other processing.

Another surprise is the occupancy of the foreign barrier queue ("Barrier Q Max"), which never exceeds one, even though an entire BRAM is dedicated and capable of holding 1K pointers. This is true even in EM3D, which has a high mutation rate and a high percentage of cross-pointers, which would seem to imply that many write barriers would generate foreign pointers. It appears these are simply drained very quickly.

As a result, there is never any need for the application to perform dynamic scheduling of writes; for these benchmarks the system is well able to keep up with its mutation rate.

While it is apparent that embodiments of the invention herein disclosed are well calculated to achieve the features discussed above, it will be appreciated that numerous modifications and embodiments may be devised by those skilled in the art, and it is intended that the appended claims cover all such modifications and embodiments as fall within the true spirit and scope of this invention.

The invention claimed is:

1. A method for dynamic memory management implemented in hardware, the method comprising:
   storing objects in a plurality of heaps; and
   operating a hardware garbage collector to free heap space occupied by specified ones of the objects, said hardware garbage collector comprising a memory module and a plurality of engines, each of the engines being in communication with the memory module to receive data therefrom, including operating the engines of the hardware garbage collector for:
   traversing the plurality of the heaps and marking selected ones of the objects of the heaps based on given criteria; and
   using said marks to identify a plurality of the objects, and freeing the identified plurality of objects.

2. The method according to claim 1, wherein the plurality of engines of the hardware garbage collector includes a system marking engine and a sweep engine, and wherein the operating the hardware garbage collector to free heap space includes:
   using the system marking engine to traverse the heaps and to mark the selected ones of the objects; and
   using the sweep engine to free the identified plurality of objects.

3. The method according to claim 2, wherein:
   the garbage collector is comprised of hardware selected from the group comprising:

reconfigurable logic devices; and an application specific integrated circuit;

each of the heaps is implemented in an associated memory with a fixed latency for read and write operations;

each of the heaps is capable of storing objects with an arbitrary but fixed number of pointer and data fields.

4. The method according to claim 2, wherein:
at least some of the objects include pointers that reference others of the objects;
the garbage collector further includes a root collection engine to provide object references that reference selected ones of the objects; and
the operating the hardware garbage collector to free heap space further includes using the system marking engine to compute a mark map by doing a transitive closure of the object references provided by the root collection engine.

5. The method according to claim 2, wherein:
the system marking engine includes a plurality of single heap mark engines; and
the using the system marking engine includes using each of the single heap mark engines to traverse a respective one of the heaps and to process the pointers of a group of the objects of said respective one of the heaps.

6. The method according to claim 1, wherein:
at least some of the objects include pointers that reference others of the objects;
the pointers of objects in each of the heaps include local pointers and foreign pointers;
the local pointers of each of the heaps point to objects stored in the each heap;
the foreign pointers of each of the heaps point to objects stored in others of the heaps;
each of the single heap mark engines includes a foreign barrier queue for storing the foreign pointers of the one of the heaps that is traversed by the each mark engine, and the each of the mark engines puts the foreign pointers in and removes the foreign pointers from the foreign barrier queue of the each mark engine for processing by others of the mark engines.

7. The method according to claim 6, wherein the using the hardware garbage collector further includes implementing a termination protocol to terminate a mark phase of the garbage collector.

8. The method according to claim 6, further comprising mapping the objects including pointers to dual port block RAMs.

9. A system for dynamic memory management implemented in hardware, the system comprising:
a plurality of heaps to store objects; and
a hardware garbage collector to free heap space occupied by specified ones of the objects, including
a memory module, and
a plurality of engines in communication with the memory module to receive data therefrom, and for traversing the heaps and marking selected ones of the objects of the heaps based on given criteria, and using said markings to identify a plurality of the objects, and freeing the identified plurality of objects.

10. The system according to claim 9, wherein:
the hardware garbage collector includes:
a system marking engine to traverse the heaps and to mark the selected ones of the objects; and
a sweep engine to free the identified plurality of objects; and the memory module includes a free stack memory to hold pointers to said identified plurality of objects.

11. The system according to claim 10, wherein the garbage collector is comprised of hardware selected from the group comprising: reconfigurable logic devices; and an application specific integrated circuit.

12. The system according to claim 10, wherein:
each of the heaps is implemented in an associated memory with a fixed latency for read and write operations; and
each of the heaps is capable of storing objects with an arbitrary but fixed number of pointer and data fields.

13. The system according to claim 10, wherein:
at least some of the objects include pointers that reference others of the objects;
the garbage collector further comprises a root collection engine to provide object references that reference selected ones of the objects; and
the system marking engine computes a mark map by doing a transitive closure of the object references provided by the root snapshot engine.

14. The system according to claim 13, wherein:
the sweep engine scans the mark map and frees the objects that are unmarked in the mark map;
the system marking engine includes a plurality of single heap mark engines; and
each of the single heap mark engines traverses a respective one of the heaps and processes the pointers of a group of the objects of said respective one of the heaps.

15. A method for dynamic memory management implemented in hardware, the system comprising:
storing objects in a heap, each of at least some of the objects including a multitude of pointers that reference others of the objects;
operating a hardware garbage collector to free heap space occupied by specified ones of the objects, said hardware garbage collector comprising a memory module and a plurality of engines, each of the engines being in communication with the memory modules of receive data therefrom, including operating the engines of the hardware garbage collector for:
traversing the heap, including using the multitude of pointers of said at least some of the objects to identify others of the objects of the heap;
processing the objects of the heap to mark selected ones of the objects based on given criteria; and
using said marks to identify a group of the objects to be freed, and freeing the identified group of the objects.

16. The method according to claim 15, wherein:
the heap is capable of storing objects with an arbitrary but fixed number of pointer fields; and
the garbage collector further includes a root collection engine to provide object references that reference selected ones of the objects.

17. The method according to claim 15, wherein the plurality of engines of the hardware garbage collector includes a mark engine and a sweep engine, and wherein the operating the hardware garbage collector to free heap space includes:
using the mark engine to traverse the heap and to mark the selected ones of the objects during a mark phase; and
using the sweep engine to free the identified plurality of objects.

18. The method according to claim 15, further comprising:
mapping the objects including pointers to dual port block RAMs; and implementing a termination protocol to terminate the mark phase of the mark engine.

19. A system for dynamic memory management implemented in hardware, the system comprising:
- a heap to store objects, each of at least some of the objects including a multitude of pointers that reference others of the objects;
- a hardware garbage collector to free heap space occupied by specified ones of the objects, including
- a memory module, and
- a plurality of engines in communication with the memory module to receive data therefrom, and for
- traversing the heap, including using the multitude of pointers of said at least some of the objects to identify others of the objects;
- processing the objects of the heap to mark selected ones of the objects based on given criteria; and
- using said marks to identify a group of the objects to be freed, and frees the identified group of the objects.

20. The system according to claim 19, wherein the plurality of engines of the hardware garbage collector includes:
- a root collection engine to provide object references that reference selected ones of the objects;
- a mark engine to receive the object references from the root collection engine, to traverse the heap and to mark the selected ones of the objects; and
- a sweep engine to free the identified plurality of objects.

* * * * *